United States Patent [19]

Sims et al.

[11] Patent Number: 4,586,038

[45] Date of Patent: Apr. 29, 1986

[54] TRUE-PERSPECTIVE TEXTURE/SHADING PROCESSOR

[75] Inventors: Edward M. Sims, Ormond Beach; Jimmy E. Chandler, Holly Hill, both of Fla.

[73] Assignee: General Electric Company, Syracuse, N.Y.

[21] Appl. No.: 560,147

[22] Filed: Dec. 12, 1983

[51] Int. Cl.$^4$ ............................................. G09G 1/06
[52] U.S. Cl. ................................... 340/729; 340/725; 434/43
[58] Field of Search ....................... 340/729, 725, 747; 434/35, 38, 43; 364/515

[56] References Cited

U.S. PATENT DOCUMENTS

| | | | |
|---|---|---|---|
| 3,747,087 | 7/1973 | Harrison, III et al. | 340/725 X |
| 3,999,308 | 12/1976 | Peters | 340/729 X |
| 4,053,740 | 10/1977 | Rosenthal | 340/729 X |
| 4,263,726 | 4/1981 | Bolton | 364/515 X |
| 4,343,037 | 8/1982 | Bolton | 434/43 X |
| 4,384,338 | 5/1983 | Bennett | 340/729 X |
| 4,475,104 | 10/1984 | Shen | 340/747 X |

FOREIGN PATENT DOCUMENTS

2113056  7/1983  United Kingdom ................ 340/729

OTHER PUBLICATIONS

Halftone Graphics Using Program Character Set, IBM/T.D.B., vol. 20, No. 6 (11/77), R. K. DeBry, pp. 2279–2280.

*Primary Examiner*—Gerald L. Brigance
*Assistant Examiner*—Vincent P. Kovalick
*Attorney, Agent, or Firm*—Carl W. Baker; Richard V. Lang

[57] ABSTRACT

A low cost, true-perspective texture/shading processor (16) for a raster graphics display is based on a mathematical model which defines modulations globally over the entire simulated, visual environment. The model uses planes defined in three-dimensional space to define the modulation. These texture planes are all orthogonal to a single gradient in a flat reference plane and cut across any number of faces. The texture/shading processor is used in a computer image generator of the type wherein a first group (11) manages a visual data base (10) and transfers data to the active environment storage of a second group (12). The second group reduces the three-dimensional description of the environment supplied by the first group to a two-dimensional description, makes perspective transformation of data into coordinates of a view window and assigns a priority to each surface of the computed scene. A third group reduces the two-dimensional description generated by the second group to a scan line by generating edge data (14) to locate where edges cross the scan line and responds to the assigned priorities (15) to eliminate hidden surfaces and generates the video for display (17) including edge smoothing, shading and texture effects. The second group further includes a face modulation processor (13) for computing data describing each texture and shading model and data describing the plane of each textured or shaded face. The texture/shading processor (16) is in the third group and is responsive to initialization data from the first group and the data computed by the face modulation processor for computing texture and shading modulation signals.

10 Claims, 12 Drawing Figures

MODEL FOR SHADED CYLINDER

PLANES DEFINED BY x-GRADIENT

PLANES DEFINED BY y-GRADIENT

PLANES DEFINED BY z-GRADIENT

TRUE-PERSPECTIVE TEXTURE/SHADING PROCESSOR

FIELD OF THE INVENTION

The present invention generally relates to computer image generation (CIG) systems that produce images in "real time" for visual training simulators, and more particularly to a low cost, true-perspective texture/shading processor for raster graphics.

BACKGROUND OF THE INVENTION

The principle application area for CIG has been that of visual training simulators which present scenes to an observer or trainee to allow the observer to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. A single simulator may be required to provide several different scenes, as, for example, in the case of an airplane having several windows in the cockpit. The two-dimensional data are converted to analog video that is presented to the operator via the display. The generated imagery is meant to be representative of the true scenes that the operator would see if the operator were actually performing the task being simulated. The generation of the display images is said to be in "real time" which is normally taken to mean 30 frames per second, as in the U.S. television standard. CIG systems are described in detail in the book entitled *Computer Image Generation* edited by Bruce J. Schacter and published by Wiley-Interscience (1983).

Absolute realism is not achieved in CIG systems, but fortunately the training mission can be accomplished satisfactorily despite this apparent drawback. Recent, developments have, moreover, remarkably improved the degree of realism attainable. Among the factors affecting the design of visual systems are texture and shading. Natural scenes are rich in texture, and the human eye relies heavily on texture cues to perceive the structure of a scene. In a flight simulator, suitable texture is required to create the visual sensations of air speed, altitude, horizon angle, and location in the environment. From a scene-processing point of view, the addition of texture to the displayed faces, i.e. planar portions of a modeled surface of the simulated scene, increases the information content without increasing the number of faces to be processed. Recent work in "cell texture" has been especially effective in this respect. This approach is described in detail in application Ser. No. 06/527,809 filed Aug. 30, 1983, by Bunker et al and entitled "Advanced Video Object Generator".

When a face is illuminated by both direct sunlight and ambient light, there are in general three components of the surface illumination; ambient (such that a point has the same brightness at every angle of observation), specular reflection (such that the angle of reflection equals the angle of incidence for a perfect reflector and the amount of reflection reaching the eye if the reflector is imperfect is related to some power of the cosine of the angle between direction of reflection and the line of sight), and diffuse reflection (reflected from a given point equally in all directions but proportional to the cosine of the angle between the light source and the reflecting surface). Visual simulators do not generally display the specular component. It has been shown that the appearance of a diffuse-reflecting curved surface can be given to planar faces by performing a linear interpolation of the intensity values (or "shading values") of the vertices of the polygons that define the planar faces. The hardware required to do this in real time is extensive and, as a result, the effect is used sparingly in actual systems.

SUMMARY OF THE INVENTION

It is therefore an object of the present invention of provide a low cost, true-perspective texture/shading processor for a raster graphics display that radically reduces the required storage and computation required both to generate and to process the digital data base.

It is another object of the invention to provide a realistic computer-generated, three-dimensional raster graphics system but at a substantially reduced cost when compared to prior art systems.

The objects of the invention are attained by the development of a mathematical model which defines modulations globally over the entire simulated, visual environment yet still provides correct, true-perspective computation of the face modulations in the raster image. This global mathematical model is generated, stored and processed using a much smaller amount of digital hardware. The basic innovation which achieves this reduction in hardware, and therefore cost, is the use of texture and shading gradients defined in three-dimensional space, instead of in each face plane, to define the texture and shading modulations. Three gradients are used. For shading, one gradient is used for each axis of the coordinate system in which the visual environment is modeled. Each gradient defines the manner in which a unit vector normal to the modeled surface varies in the direction of the corresponding axis. One set of gradients is used for each shaded object. For texturing, which is applied to the ground surface, all three gradients are defined in a nominal, flat ground plane. Each gradient defines a parallel series of planes of equal intensity. For each gradient, a reference point and reference value are also defined. The gradients define the variation of the surface normal or the texture stripe number relative to the reference value.

The hardware savings of this approach is achieved by the fact that only one set of gradients and reference values is required for each shaded object and for each texture pattern on the ground surface. Previous systems have required that different gradients and reference values be defined for each shaded or textured polygon face. Each set of gradients and reference value requires a proportional amount of processing to generate and to be transformed into the viewer's coordinate system. Hardware costs are generally reduced in proportion to the reduction in processing and storage.

BRIEF DESCRIPTION OF THE DRAWINGS

The foregoing and other objects, aspects and advantages of the invention will be better understood from the following detailed description of the invention with reference to the accompanying drawings, in which.

DETAILED DESCRIPTION OF THE INVENTION

Figure 1:
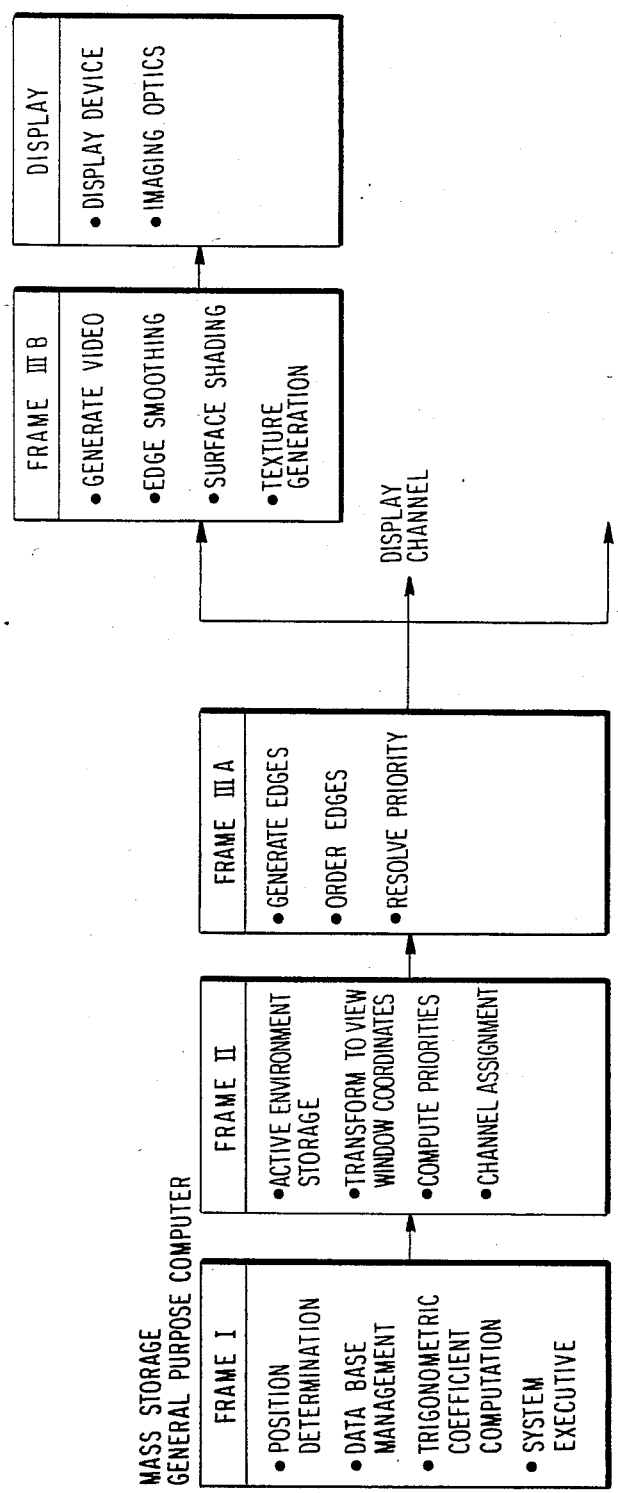
FIG. 1 is a functional block diagram showing the basic CIG system in which the subject invention is incorporated.

The basic CIG system in which the subject invention is incorporated consists of three major components termed Frame I, Frame II and Frame III. The "Frame i" designation refers to groupings of functions that were allotted one frame time (i.e., 1/30 second) for computation. The entire process therefore required three frame times from start to finish. While these conditions no longer hold true in general, the terms are still useful for identification purposes. Figure 1 shows the overall functional diagram of the CIG system. Frame I computations are normally performed in a minicomputer with a large magnetic disk storage. In this frame, the position of the viewpoint and any moving models, such as other aircraft, are determined in a common coordinate system. The principal function performed by Frame I is to manage the data base transferring data from disk storage to the active environment storage in Frame II to provide the subsequent processing with a description of the surrounding environment. Frame I also generates trigonometric coefficients required for perspective transformation and performs system executive functions such as, for example, maintenance.

Frame II is part of a special-purpose computer. The function of Frame II can be thought of as reducing a three-dimensional description of the environment to a two-dimensional description for each viewing window. Frame II contains a rather large active-environment store that provides the data necessary to generate the scene from the viewpoint location. The active-environment storage is accessed by Frame II to obtain only that data that describes the scene as viewed through the view window of each display channel. The data undergoes a perspective correction to transform it into the coordinates of each view window. The data receives a channel assignment that will be used later to route it to the proper display channel. Frame II also assigns a priority to each surface in the scene. The priorities are assigned so that surfaces closer to the viewpoint have a higher priority than more distant surfaces. These priorities are used in subsequent processing to determine which surface should be displayed when one object is occulted by another.

Frame III essentially has the function of reducing the two-dimensional representation of a scene to a scan line or a one-dimensional representation. Frame III is broken into two halves: Frame IIIA, which serves all display channels, and Frame IIIB, which is replicated for each display channel. Frame IIIA generates edge data from the vertex designation used in earlier processing. This edge data locates where the edge crosses a scan line, describes the characteristics of the surface to the right of the edge, and is generated for each scan line crossing the edge. After the edge data is ordered, the priority data is used to eliminate edge data for hidden surfaces.

Frame IIIB processes the lists of edge crossings it receives to generate video for the displays. It performs an edge smoothing to eliminate undesirable quantization effects, performs curved-surface shading, and generates texture for surfaces that are to receive a texture pattern. The computations required in Frame IIIB are relatively straight forward but must be performed at very high pixel rates (30–40 MHz) which accounts for the usually high costs of this subsystem. More specifically, the computation of face modulation in previous CIG systems has required that different patterns be stored for each face in a digital data base and that these patterns be processed separately for each face. This has required large storage and computational hardware. The present invention, however, is an improvement to this subsystem that radically reduces the required storage and computation and therefore greatly reduces the costs of the subsystem. This reduction is accomplished by the development of a mathematical model which defines the modulations globally over the entire simulated, visual environment, yet still provides correct, true-perspective computation of the face modulations in the raster image. This global math model is generated, stored, and processed using a much smaller amount of digital hardware.

The display subsystem consists of either a CRT or light valve projector to produce an image from the video. The display subsystem includes some optics designed to place the image at infinity relative to the viewpoint.

Figure 2:
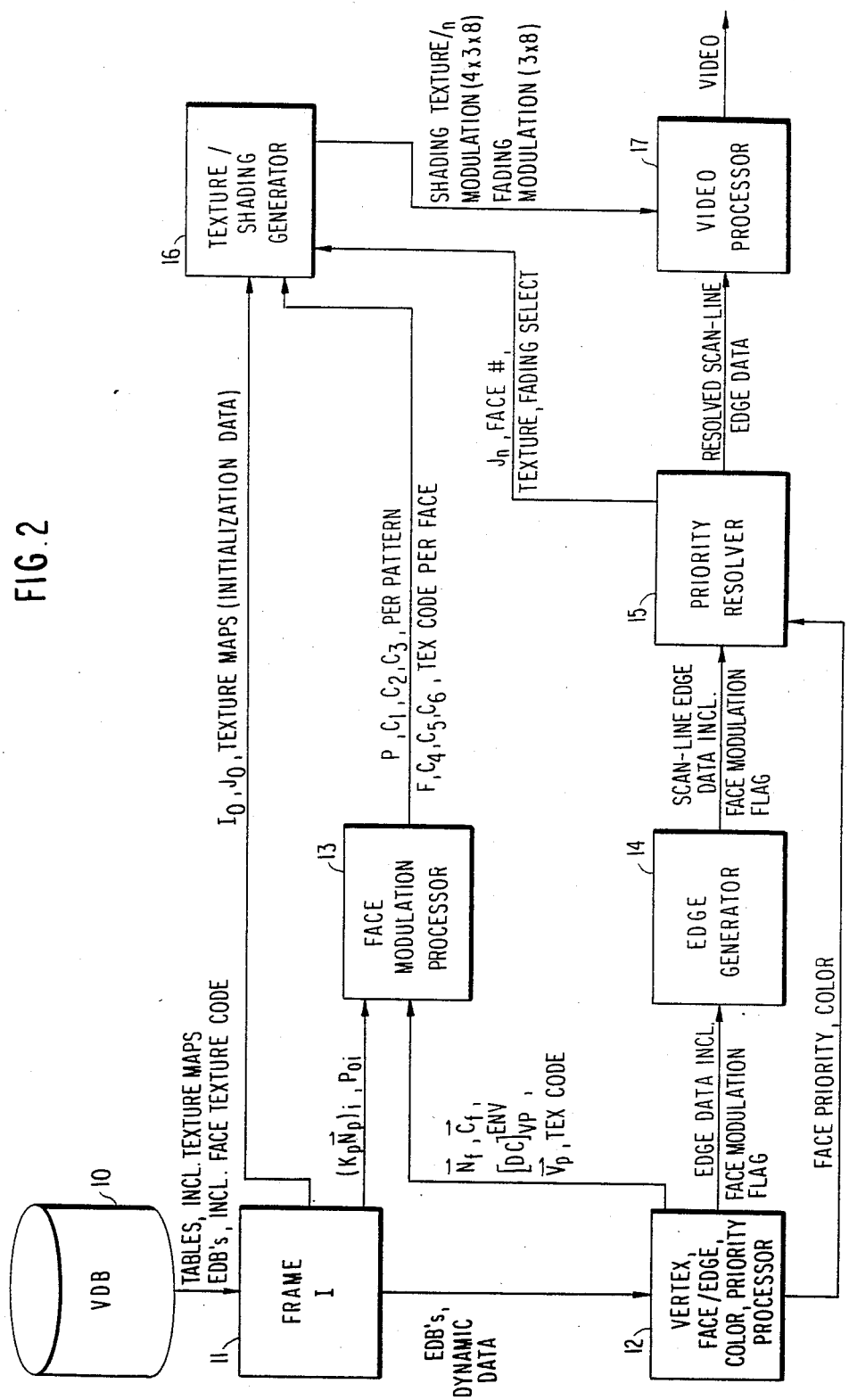
FIG. 2 is a more detailed block diagram of the CIG system showing the texture generator according to the invention.

FIG. 2 is functional block diagram of the CIG system of FIG. 1 drawn to emphasize face modulation processing 13 and the texture/shading generator 16 of the present invention. A disk storage 10 contains the visual data base (VDB) that is supplied to Frames I and II. Frame I loads in processor 12 the environment data blocks (EDB's) of the VDB, describing the geometry of the data base to vertex, face/edge, color, and priority processing. Processor 12 is part of Frame II. Frame I also supplies to processor 12 dynamic data in the form of a viewpoint vector $V_p$ relative to the environment coordinate system and a direction cosine matrix $[DC]_{VP}^{ENV}$ to rotate the environment from its coordinate set (x,y,z) into that of the view point (u,v,w). Frame II uses this data to perform a perspective mapping of the face edges of the environment into the view plane. This edge data is sent to the edge generator 14 of Frame III which computes the intersections (edge-crossings) of the edges with each raster line and orders these by element number. The ordered edge crossings, together with face priority and color data are used by the priority resolver 15 to eliminate hidden edges. The priority resolver 15 supplies to the video processor 17 an ordered list of edge crossings with pixel area and color data. The texture/shading generator 16 generates texture, shading and fading modulation data for up to three face areas in each of four pixels during every 120 ns. logic clock interval. The texture modulation values are between 0.0 and 2.0 and may be different for each pixel. The fading modulation values F are between 0.0 and 1.0 and are identical for the four pixels. The video processor 17 applies the texture and fading modulations to each of the three face areas per pixel according to the following equation:

$$C = (1 - A_p)[\Sigma_i A_i T_i F_i C_i + C_H \Sigma_i A_i (1 - F_i)] + A_p C_p$$

where
C is the computed pixel color (red, green or blue),
$A_p$ is the point feature area,
$A_i$ A are the face areas where i=1, 2 or 3,
$T_i$ is 1 or $T_A$ or $T_B$ based on the texture select code, where $T_A$ is the last face texturing or shading modulation to be updated and $T_B$ is the next-to-last face shading modulation to be updated,
$F_i$ is 1 or $F_{SG} F_A$ or $F_B$,
$F_{SG}$ is sky or ground fading per pixel,
$F_A$ is the last face fading value to be updated,
$F_B$ is the next-to-last fading value updated,
$C_i$ is the face color associated with area i,
$C_H$ is the haze color, and
$C_p$ is the point feature color.

The texture/shading generator 16 operates on the current line being processed by the video processor 17, starting a few clocks ahead.

While it should be understood that texture is a modulation of a face in the form of a series of parallel stripes of varying intensities, a brief digression at this point should serve to place the subject invention in proper perspective. In early CIG systems, individual edges would have been used to model the boundaries of each stripe. However, if the stripes are equally spaced and parallel, they can be specified and processed in a much more economical way. A single gradient vector in the plane of the face can indicate the spacing and orientation of the series of stripes. A modeler defines texture by specifying from one to three gradients in the plane of each textured face. In addition to these gradients, a texture map number and a starting point for the map are assigned to each gradient to indicate the modulation values associated with each stripe. This method allows each face to be textured differently without subdividing the faces into edges; however, it still requires about 45 bytes of data to define the gradients, start values, and texture map codes for each different texture. The storage and processing of this data are comparable to the storage and processing for about four edges per face. For very large faces, this provides an economical reduction compared to processing every texture edge independently. Further reductions in memory and computations are still needed to provide truly low-cost systems.

In most applications of texture, it is desirable to extend a single texture pattern over a number of adjacent faces. For example, if a forest texture covers portions of several contiguous terrain faces, the texture should flow from one face to the next without any discontinuities, since such discontinuities would tend to accentuate the boundaries of the individual terrain faces. This is even more important for "regular" textures such as those used to represent plowed fields or orchards.

The present invention allows a continuous texture pattern covering any number of faces to be specified by a single set of gradients, start values and map codes. This method not only reduces data storage requirements, but it also eliminates the need to project gradients independently for each face. Finally, because the texture for all faces representing the same type of surface is specified by a single set of data, it is easy to modify a texture, whether to improve its appearance, to correct a modeling error, or to simulate motion of a surface, e.g. flowing water.

Figure 3:
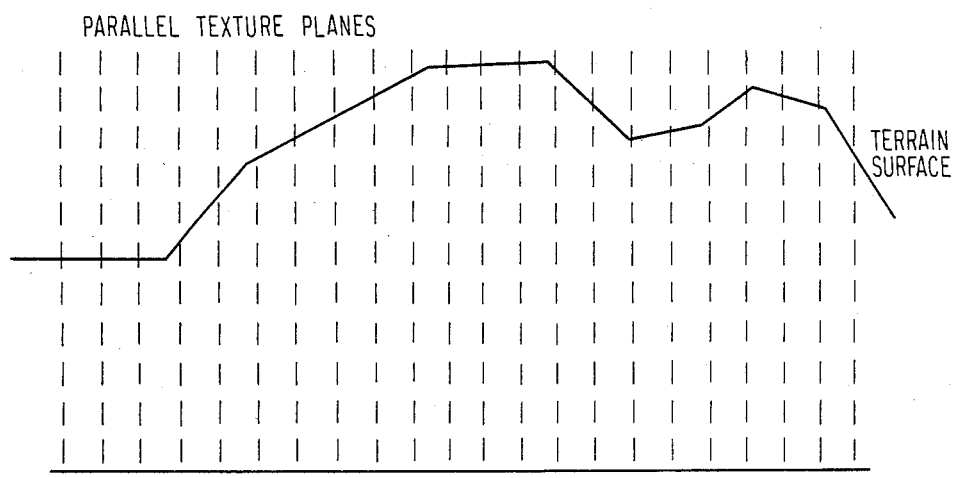
FIG. 3 is a two-dimensional representation of the intersection of a terrain surface with texture planes.
Figure 4:
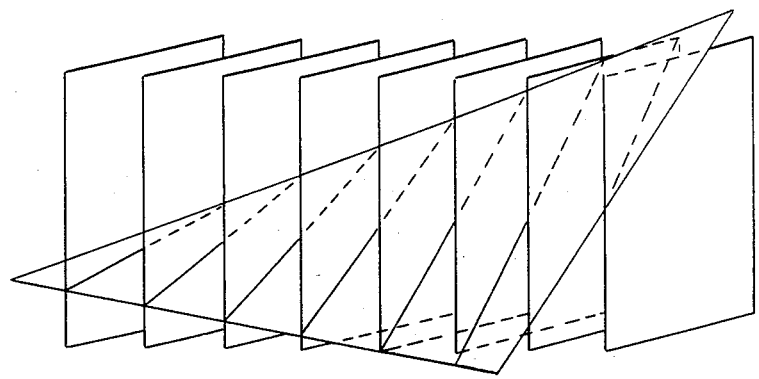
FIG. 4 is a three-dimensional representation of the intersection of parallel, equally-spaced texture planes with the plane of a face to define parallel texture stripes.

The basic innovation which achieves this reduction in cost is the use of planes defined in three-dimensional space, instead of stripes in each face plane, to define the texture or shading modulation. This concept is illustrated in FIGS. 3 and 4 where a face is divided into texture stripes by a series of parallel texture planes. The same stripes could be defined by planes oriented at a different angle to the plane of the face, as long as the lines of intersection are held constant. A series of parallel planes, just as a series of parallel lines, can be specified by an orthogonal gradient whose length is proportional to the spacing between the planes. The gradient need not be in the plane of the face. To show how this approach is used, consider a network of faces defining a terrain surface. FIG. 4 shows a cross-section of such a terrain which is segmented by a series of texture planes. The texture planes are all orthogonal to a single gradient in a flat reference plane. These planes may cut across any number of faces. Where the intersections occur, texture stripes will be defined. These texture stripes have two important properties. First, they will match up at all face boundaries, assuring continuity of texture. Second, although their relative spacing will vary with the slope of each face, they will have a constant spacing in any x-y plane. This kind of geometry is expected for many types of features frequently represented by texture such as, for example, plowed furrows, fields, city blocks, or tree lines. Other textures, such as lines of bricks in a wall, might be defined by a series of horizontal planes. The same set of planes could be used for any wall with equally spaced bricks.

Figure 5:
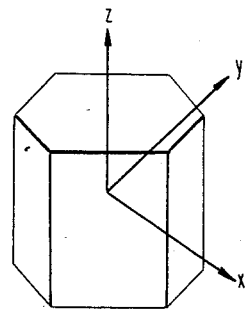
FIG. 5 is a three-dimensional representation of the intersection of parallel, equally-spaced shading planes with an object to define contours of equal shading normals.
Figure 5:
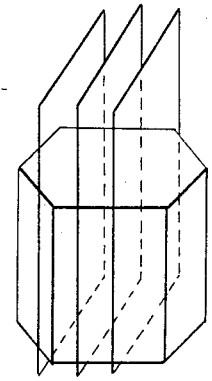
Figure 5:
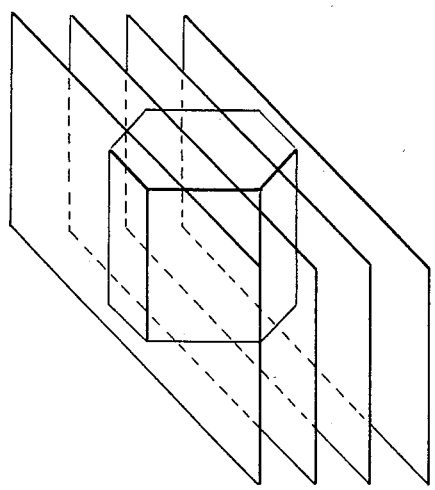
Figure 5:
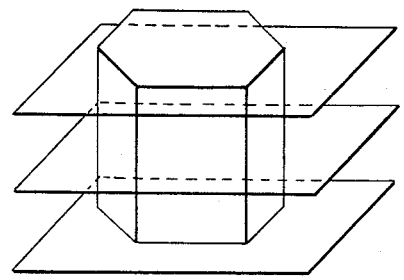

Shading, like texturing, has been defined by gradients in the face plane. The shading gradients define the vector normal to any point on an object surface. However, this vector normal, much like the texture stripes, should match at each edge of an object in order to create the appearance of smoothness of the surface at that edge. Therefore, a single set of gradients can be defined for each shaded object of the visual environment model. This is illustrated in FIG. 5.

The present invention computes the point on each textured/shaded face onto which each pixel of the image raster falls when it is inverse perspectively mapped from the view plane into the visual environment. It then determines the location of this point relative to the parallel planes defining the texturing or shading pattern. The mathematics by which this mapping is computed is as follows. The planes defining either a texture or a shading pattern can be defined by the locus of points in the environment satisfying the following equation:

$$P_a = P_o + K_p N_p \cdot V_{oa},$$

where
$P_a$ is the pattern value at point a,
$P_o$ is the pattern value at a reference point,
$K_p N_p$ is the gradient vector defining the rate of change of P, and
$V_{oa}$ is the vector from the reference point to the point a.
A given value of P defines a plane in space which is parallel to the plane defined by any other value of P. The terms $P_o$ and $K_p N_p$ are the basic quantities defining a given pattern.

Figure 6:
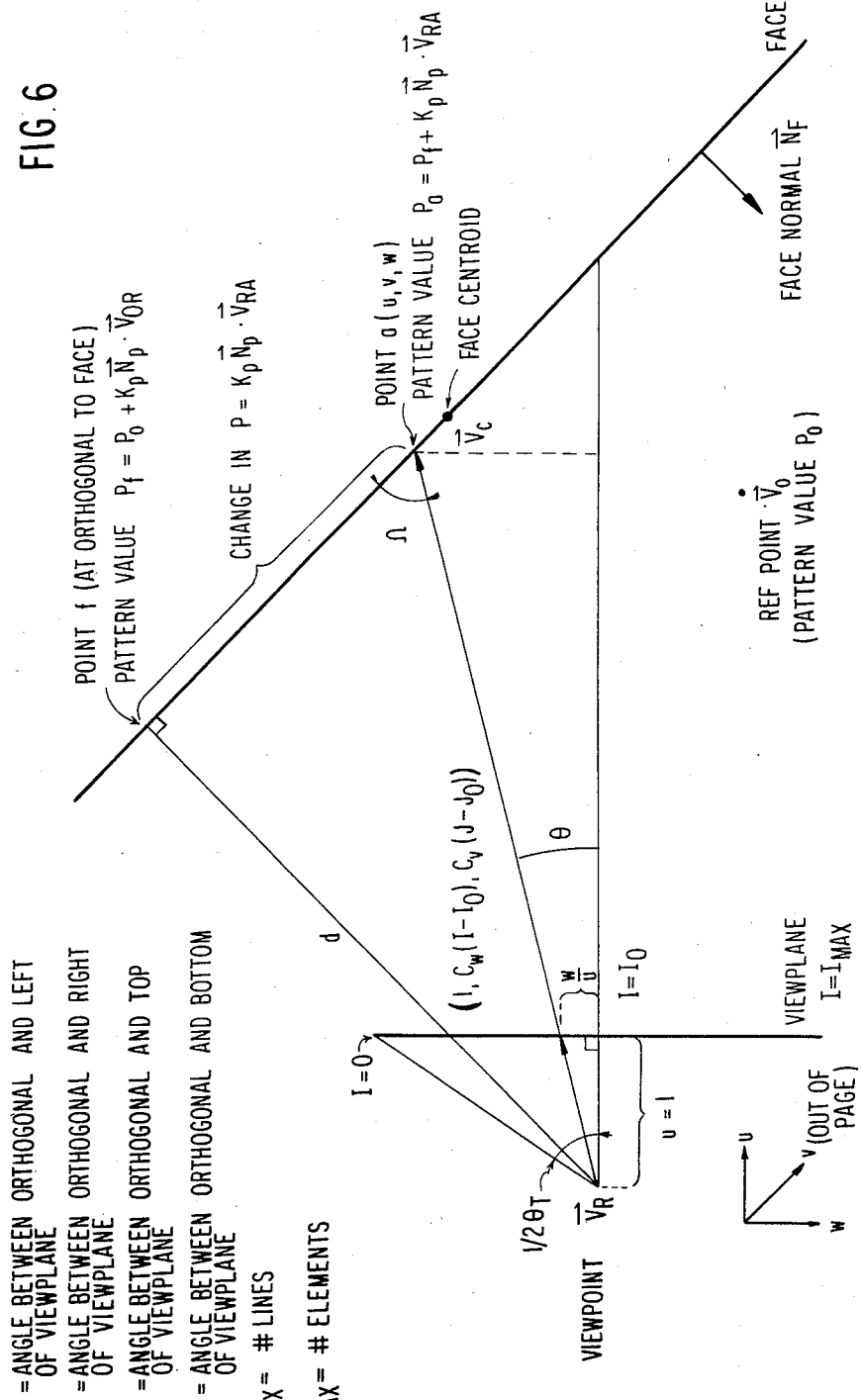
FIG. 6 is a graphical illustration of the manner in which the mapping of the line numbers and pixel numbers is accomplished.

Because texturing and shading are applied in Frame III to each pixel of each textured/shaded face, it is necessary to compute the point in space corresponding to each pixel (I,J), where I is the line number and J is the pixel number. The manner in which this mapping is computed is illustrated in FIG. 6. This figure shows a cross section of the u-w plane in viewer space. The intersection of the view plane and of the face with the u-w plane are shown with bold lines. The line number I of the viewer raster increases from top to bottom in the view plane. To find the coordinates u and w of the point a on the faces, first u and then w/u are computed.

The coordinate u is the distance along an orthogonal to the view plane from the view point to point a. From the figure, $$u = d \frac{\cos\theta}{\cos\Omega},$$

where
$$d = -N_f \vec{V}_{RC}$$

$$\cos\theta = \frac{1}{[(1, C_w(I - I_o), C_v(J - J_o)) \cdot (1, C_w(I - I_o), C_v(J - J_o))]^{\frac{1}{2}}}$$

$$\cos\Omega = \frac{-(1, C_w(I - I_o), C_v(J - J_o)) \cdot \vec{N}_f}{[(1, C_w(I - I_o), C_v(J - J_o)) \cdot (1, C_w(I - I_o), C_v(J - J_o))]^{\frac{1}{2}}}$$

or $$u = \frac{d}{N_{fu} + N_{fw} C_w(I - I_o) + N_{fv} C_v(J - J_o)},$$

where $$C_w = \frac{\tan\theta_T + \tan\theta_B}{I_{max}}, \text{ and}$$

$$C_v = \frac{\tan\theta_L + \tan\theta_R}{J_{max}}.$$

The ratio w/u is just $C_w(I-I_o)$, while v/u is just $C_v(J-J_o)$. Thus, the (u, v, w) components of point a are $$\frac{(1, C_w(I - I_o), C_v(J - J_o))}{\frac{N_{fu}}{d} + \frac{N_{fw}}{d} C_w(I - I_o) + \frac{N_{fv}}{d} C_v(J - J_o)}.$$

Given a pattern gradient $(K_p N_p)_{uvw}$ in the view plane coordinate system, the pattern value at point a will be $$P_a = P_f + \frac{K_p N_{pu} + K_p N_{pw} C_w(I - I_o) + K_p N_{pv} C_v(J - J_o)}{\frac{N_{fu}}{d} + \frac{N_{fw}}{d} C_w(I - I_o) + \frac{N_{fv}}{d} C_v(J - J_o)},$$

where $P_f = P_o + K_p N_p \cdot V_{RC}$.

The computation can be simplified by grouping those terms which are constant for a given face or pattern:

$$\left. \begin{array}{l} P_f = P_o + \vec{K_p N_p} \cdot \vec{V}_{RC} \\ C_1 = K_p N_{pu} \\ C_2 = K_p N_{pw} C_w \\ C_3 = K_p N_{pv} C_v \end{array} \right\} \text{constant per pattern}$$

$$\left. \begin{array}{l} C_4 = \frac{N_{fu}}{d} \\ C_5 = \frac{N_{fw}}{d} C_w \\ C_6 = \frac{N_{fv}}{d} C_v \end{array} \right\} \text{constant per face}$$

The computation which must then be performed on a pixel-by-pixel basis is as follows:

$$P = P_f + \frac{C_1 + C_2(I - I_o) + C_3(J - J_o)}{C_4 + C_5(I - I_o) + C_6(J - J_o)}.$$

The present invention includes face modulation processor 13, which is added to Frame II and computes the face and pattern coefficients, and the texture/shading generator 16, which is added to Frame III and computes the texturing and/or shading modulation on a pixel-by-pixel basis. Because the operations of face modulation processor 13 are greatly simplified by the math model for texturing/shading of the present invention, these operations are performed using the existing Frame I general purpose computer and Frame II arithmetic pipelines of the basic image generator. Therefore, the only added hardware unit is the texture/shading generator 16. The texture/shading generator 16 computes, for every group of four pixels, the inverse perspective mapping of that group onto the surface of one or two incident faces. From this mapping, it computes either a shading modulation or a texture modulation for each face at each of the four pixels of the group.

Figure 7:
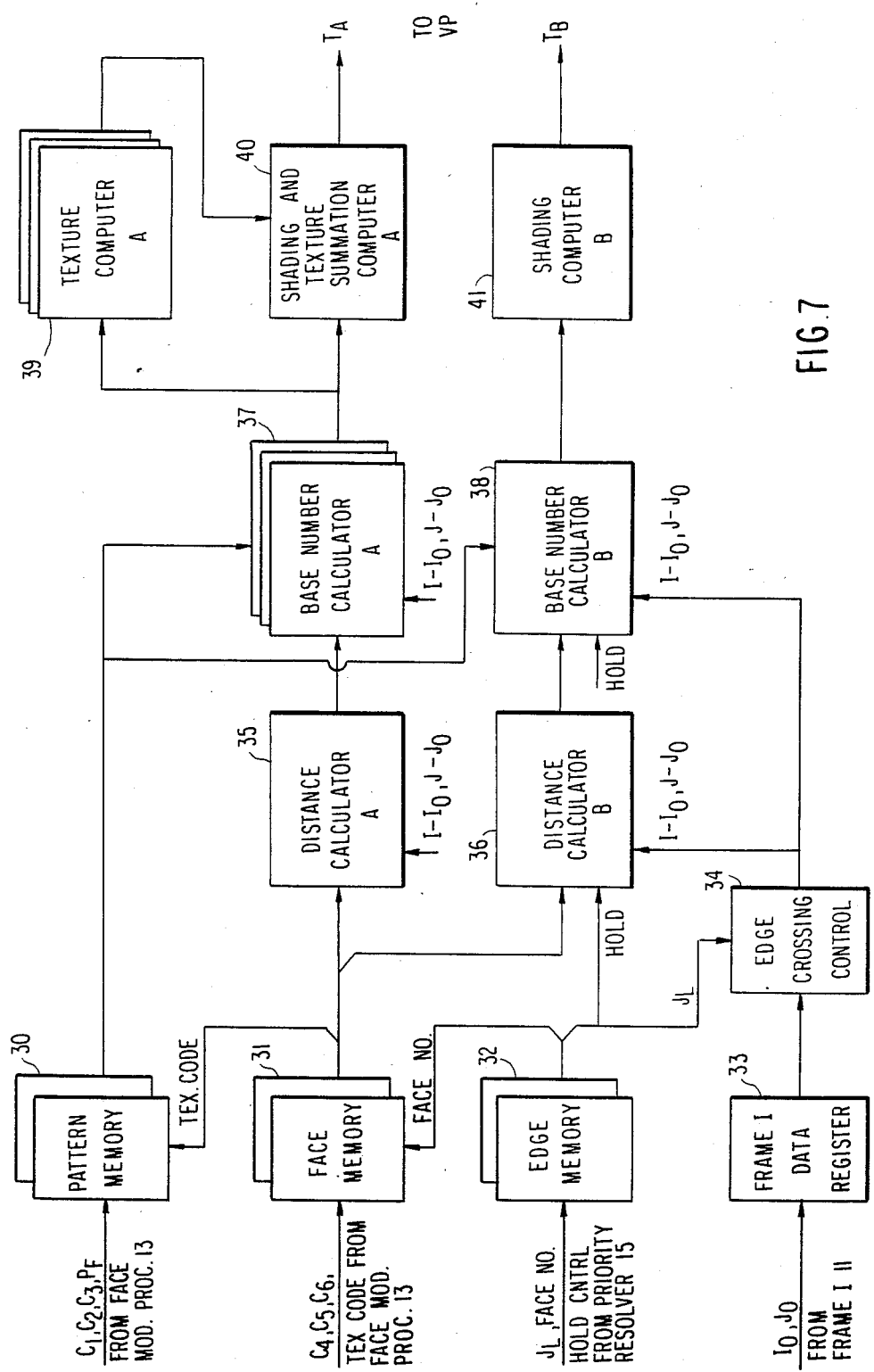
FIG. 7 is a block diagram of the texture/shading generator according to the invention.

FIG. 7 is a block diagram of the texture/shading generator. The texture/shading generator receives data in three ping-pong memories 30, 31 and 32. Data describing each texture or shading model is received from face modulation processor 13 and stored in the pattern memory 30. Data describing the plane of each textured or shaded face is also received every field time and is stored in the face memory 31. Finally, for every raster line of the field, data describing each edge is received from the priority resolver 15 and stored in the edge memory 32. The two sides of the pattern memory 30 and the face memory 31 are exchanged every field time such that data for the field currently being displayed is being read out while data for the next field is being written. The two sides of the edge memory 32 are alternated every raster line time such that data for the line currently being displayed is being read out while data for the next line is being written.

Figure 8:
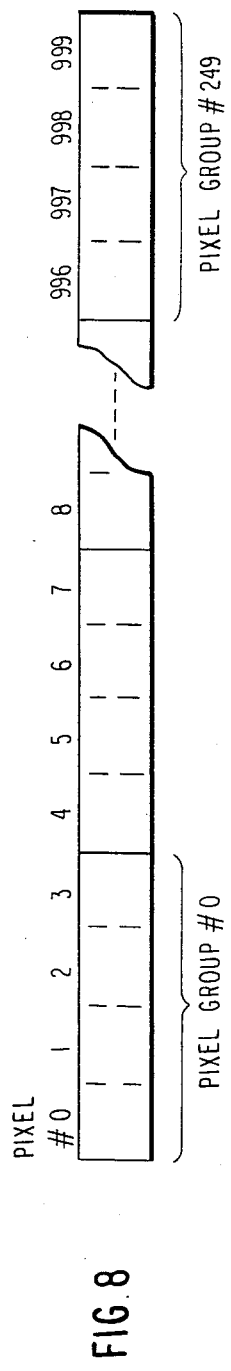
FIG. 8 is a diagram illustrating the subdivision of a raster line into pixels and pixel groups.

FIG. 8 illustrates the subdivision of a raster line into pixels and pixel groups. Texturing/shading is computed for four pixels at a time in order to achieve high resolution video rates (approximately 25 to 30 MHz). One pixel group is computed every 120 ns. The basic operation of the texture/shading is to map each four-pixel group into one shading modulation for one or two faces or into one, two, or three texture stripe maps for one face. Two shaded faces are computed if an edge between two shaded faces appears in the four-pixel group. If there are more than one textured or two shaded faces in the group, then one or more face modulations are approximated by the value 1.0 or by the Face A or Face B modulation. The requirement to calculate two shaded faces while only one textured face can be computed is imposed because it is more important to avoid discontinuities in a shaded surface than in a textured surface.

The calculations of the texture generator are performed in a pipelined manner and during any give clock time, several pixel groups may be in various stages of processing. It is convenient to consider the operations performed on one pixel group as it sequences through the stages of the pipeline. First, edge data is read from the edge memory 32. This data includes the element-value $J_L$ of a new edge to be processed, the face number to be used for new texture/shading calculations for that pixel group, and a "hold flag". The hold flag indicates that data for the current face is to be retained for shading path "B" computations in the next pixel group. The face number read from the edge memory 32 is used to address face data in the face memory 31 which is stored by face number. The denominator coefficients $C_4$, $C_5$ and $C_6$ are used for distance computation in calculators 35 and 36, while the texture code is used to address pattern data from the pattern memory 30 and to select the appropriate texture maps for texture computation.

A Frame I data register 33 stores the line and element number of the pixel at the orthogonal to the view plane. These are used by edge crossing control 34 to compute a relative line number (I−Io) and element number (J−Jo) from the element-value $J_L$ and current line I.

Calculators 35 and 36 perform distance calculations A and B by computing the distance u to the upper left, upper right and lower left corners of each pixel group for the current and previous face number, respectively. The formula used is $$u = \frac{1}{C_4 + C_5(I - Io) + C_6(J - Jo)}.$$

The distances $u_A$ and $u_B$ calculated by the distance calculators 35 and 36 are used by base number calculators 37 and 38, respectively, to inverse perspectively transform the pixel groups into the shading modulations or texture stripe numbers. Base number calculator 37 maps the upper left corner of the pixel group into three texture stripe numbers or one shading modulation value for Face A. It also computes the change in stripe number over four elements ($\Delta P_J$) or over four lines ($\Delta P_I$) for each of the three texture patterns and computes the shading modulation value at the upper right corner of the pixel group. Base number calculator 38 computes the shading modulation at the upper left and upper right corners of the pixel group for Face B, a previous face identified by the hold flag. The formulas are as follows:

Upper Left:
$P_{I,J} = u_{I,J}[C_1 + C_2(I - Io) + C_3(J - Jo)] + P_f$

Bottom Left:
$P_{I4,J} = u_{I4,J}[C_1 + C_2(I + 4 - Io) + C_3(J - Jo)] + P_f$

Upper Right:
$P_{I,J4} = u_{I,J4}[C_1 + C_2(I - Io) + C_3(J + 4 - Jo)] + P_f$

Four Element Change: $\Delta P_J = P_{I,J4} - P_{I,J}$, and

Four Line Change: $\Delta P_I = P_{I4,J} - P_{I,J}$ where $I4 = I + 4$ and $J4 = J + 4$.

Figure 9:
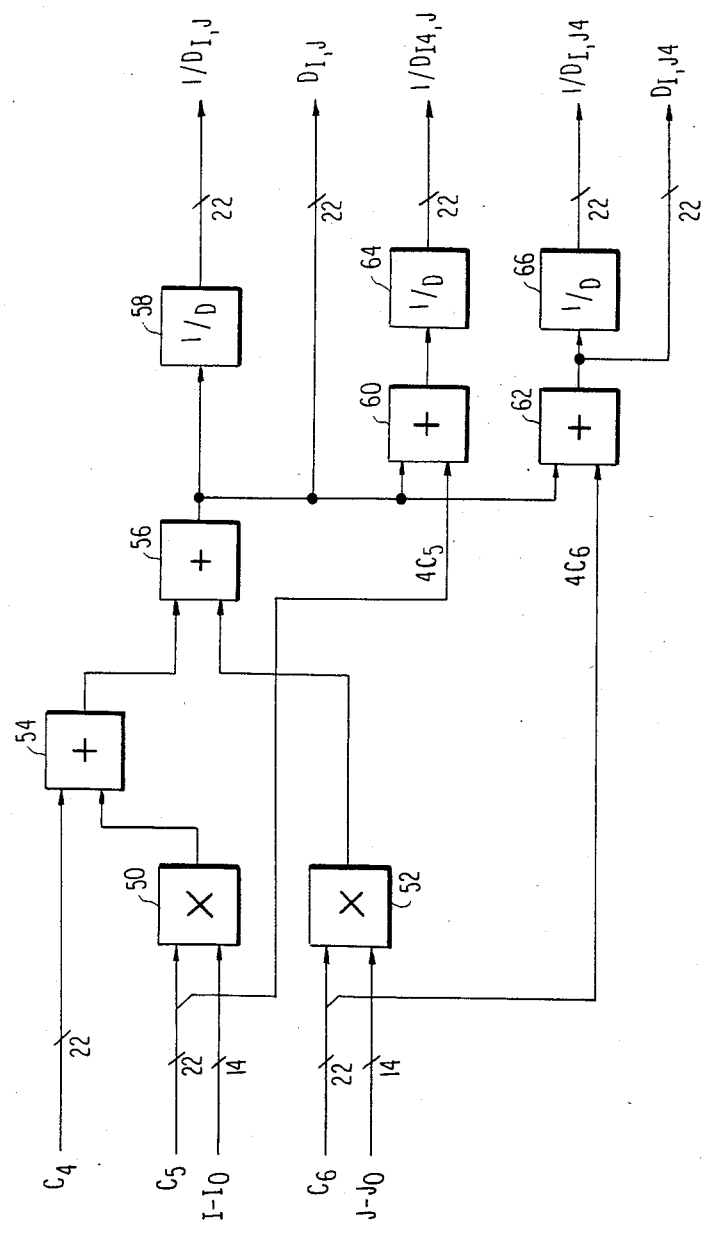
FIG. 9 is a block diagram of the distance calculators 35, 36 of the texture/shading generator shown in FIG. 7.

FIG. 9 shows the distance calculation 35, 36 hardware configuration. This logic calculates the required distance terms in 22-bit floating point format. This format uses a 6-bit exponent and a 16-bit argument in two's complement form. The $C_5$ coefficient is multiplied in multiplier 50 by the 14-bit I—Io four pixel group line location. Multiplier 50 comprises 16-bit multiplier and exponent adder integrated circuits (ICs). The $C_6$ coefficient is multiplied in multiplier 52 by the 14-bit J-Jo four pixel group element location. Multiplier 52 is similar to multiplier 50. The results of these multiplications are added in adders 54 and 56 to the $C_4$ starting coefficient using floating point arithmetic logic unit (ALU) ICs. The result is the distance term for the I,J ($D_{I,J}$) element position of the four pixel group. The reciprocal of this distance term is calculated using firmware lookup and summers in a Taylor series expansion unit 58. The reciprocal is used to implement the hardware divide to allow a multiply operation instead of the more difficult divide operation.

The distance calculation for the four line position is obtained by adding four times the $C_5$ coefficient to the $D_{I,J}$ result in adder 60. Similarly, the distance calculation for the four element position is obtained by adding four time the $C_6$ coefficient to the $D_{I,J}$ result in adder 62. The reciprocal for these two locations is also taken in firmware units 64 and 66.

Figure 10:
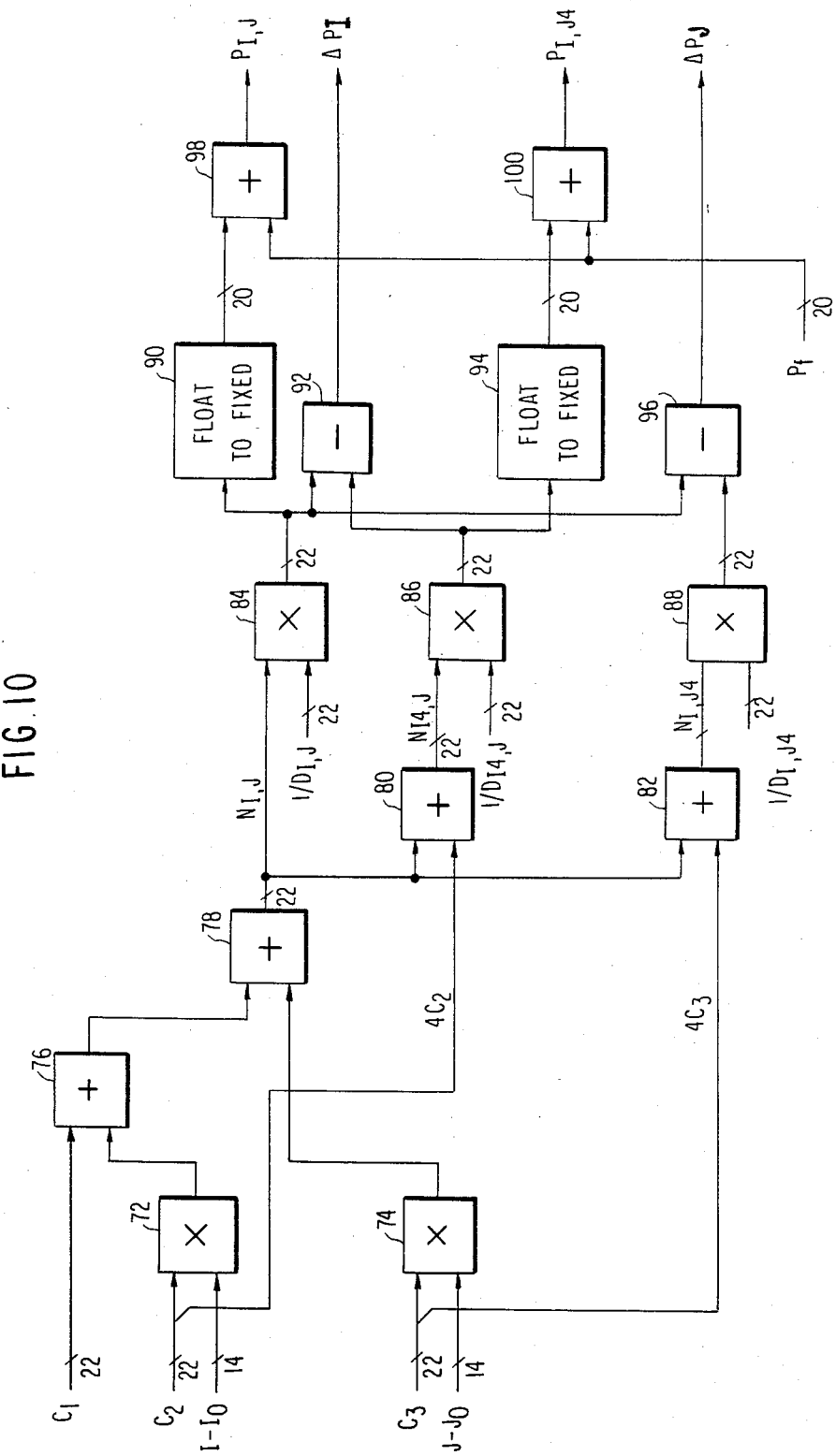
FIG. 10 is a block diagram of base number calculators 37, 38 of the texture/shading generator shown in FIG. 7.

The numerator calculation is shown in FIG. 10. This is the base number calculator 37 and is repeated three times for the three independent texture stripes to be calculated. The base number calculator 38 comprises similar logic. The $C_2$ coefficient is multiplied in multiplier 72 by the 14-bit I−Io four pixel group line location using 16-bit multiplier and exponent adder ICs. The $C_3$ coefficient is multiplied in multiplier 74 by the 14-bit J-Jo four pixel group element location. The result is then added in adders 76 and 78 to the $C_1$ starting coefficient using floating point ALU ICs. The result is the numerator term for the I,J ($N_{I,J}$) element position of the four pixel group.

The numerator calculation for the four line position is obtained by adding four times the $C_2$ coefficient to the $N_{I,J}$ result in adder 80. Similarly, the numerator calculation for the four element position is obtained by adding four times the $C_3$ coefficient to the $N_{I,J}$ result in adder 82. The N/D hardware divide for the three terms is calculated by multiplying the reciprocal of the denominator obtained from firmware units 58, 64 and 66 times the numerator terms. This is accomplished using 16-bit multiplier and exponent adder ICs 84, 86 and 88, respectively. The fixed point conversion of the I,J pattern number is then calculated by first converting from floating to 20-bit fixed format in converter 90 and then adding the $P_f$ offset with fixed point adder 98. The fixed point version of the P number for the I,J4 pixel position is similarly taken with converter 94 and adder 100. The pattern gradient in the element direction is calculated with floating point ALU 96, and the pattern gradient in the line direction is calculated with floating point ALU 92.

Figure 11:
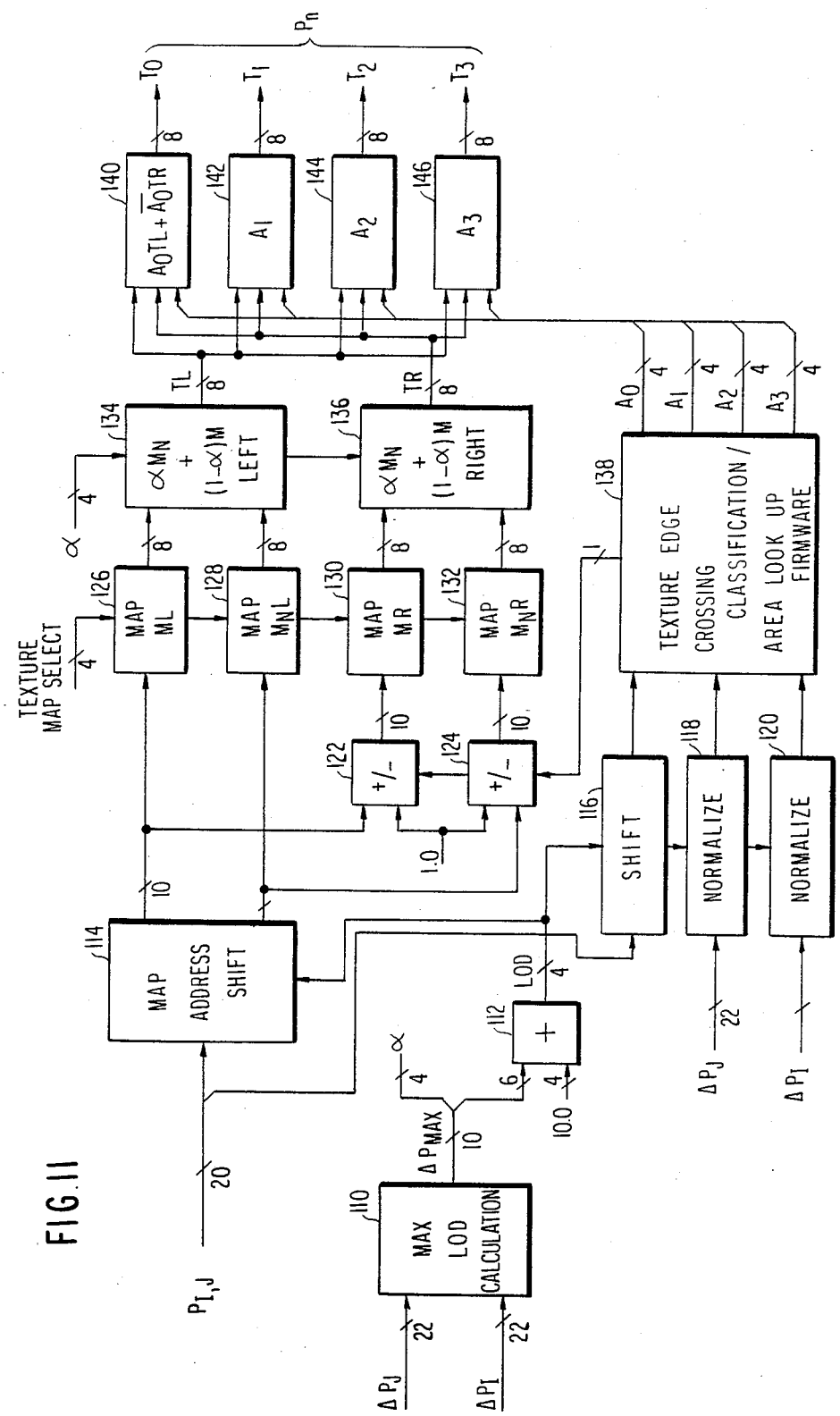
FIG. 11 is a block diagram of texture computer 39 of the texture/shading generator shown in FIG. 7.

The logic for the texture modulation calculator 39 is shown in FIG. 11. This logic is also repeated three times, one for each of three independent texture stripe orientations and spacing. The actual texture modulation maps are contained in map memories 126, 128, 130 and 132. The maps for this configuration were chosen in the preferred embodiment of the invention to be 1024 depth with a selection of sixteen different maps total. The four bit texture map select code selects the one-of-sixteen map desired. The modulation maps are normally loaded through a test bus prior to an acutal flight simulation run. Each of the three texture paths can have independent map modulations so that a large variety of patterns may be obtained in the three texture path summation. Each map is 8-bits wide so that a total of 256 modulation values may be defined for each texture stripe.

The maps are stored with ten different levels of details (LOD) as part of an antialiasing scheme. Each successive LOD is an average of the previous more detailed level. The most detailed map of 1024 stripes is LOD 0. The next level, LOD 1, contains 512 stripes, and so forth all the way to LOD 10 which contains only one modulation value. As a simulation view point grows more distant from a textured surface, a smooth blend between a map's LOD levels is generated to prevent scintillation at the displayed pixel locations.

The LOD map selection and blend control is calculated from the floating point pattern gradients 110. The absolute value of the $\Delta P_J$ and $\Delta P_I$ gradients are compared to select the largest. One half the absolute value of the smaller gradient is then added to the absolute value of the larger gradient to obtain the $\Delta P_{max}$ gradient. This calculation will approximate the diagonal maximum gradient which will be rotationally invarient, preventing a change in a map's LOD as the pattern's view point is rotated. The maximum gradient is then used to obtain the map LOD value and a 4-bit alpha ($\alpha$) term which represents the relative view point position between two different map LODs. The 4-bit LOD number is generated by adder 112 and is defined to be the map LOD level which insures that no more than one texture modulation change occurs within a four element by four line pixel group. The locus of pixels at which the modulation change occurs is called a texture edge.

In the preferred embodiment, each map requires storage of 1024 bytes (8-bits of word width for each location) for the highest resolution level. Each coarser map LOD requires a factor of two less storage as follows:

| LOD | MAP |
|---|---|
| 0 | 1024 |
| 1 | 512 |
| 2 | 256 |
| 3 | 128 |
| 4 | 64 |
| 5 | 32 |
| 6 | 16 |
| 7 | 8 |
| 8 | 4 |
| 9 | 2 |
| 10 | 1 |
| | 2047 Bytes Total Storage |

The map storage is arranged so that the computed map LOD n and the next coarser LOD n+1 is available simultaneously so that a smooth blend between LODs may be accomplished in one system clock period. This requirement is met by having the map storage broken up into separate memories A and B as follows:

| LOD | (1K×8) MEM A ADRS | (1K×8) MEM B ADRS | TOTAL REQUIRED STORAGE/ LOD LEVEL |
|---|---|---|---|
| 0 | 0->511 | 512->1023 | 512 |
| 1 | 256->511 | 0->255 | 256 |
| 2 | 0->127 | 128->255 | 128 |
| 3 | 64->127 | 0->63 | 64 |
| 4 | 0->31 | 32->63 | 32 |
| 5 | 16->31 | 0->15 | 16 |
| 6 | 0->7 | 8->15 | 8 |
| 7 | 4->7 | 0->3 | 4 |
| 8 | 0->1 | 2->3 | 2 |
| 9 | 1 | 0 | 1 |
| 10 | 0 | 0 | 1 |

Note that memory A and B alternate lower and upper map portions depending on what LOD is being addressed. This alternation is controlled in the map address shift 114 by tri-stating either the LOD n or LOD n+1 output to the A or B memory boards depending upon the least significant bit (LSB) of the LOD number. The address shift is controlled by the LOD number. The address bits are shifted to select the different LOD levels within a map memory as follows:

| LOD | MSB | | | MAP ADDRESS | | | | | | LSB |
|---|---|---|---|---|---|---|---|---|---|---|
| 0 | 0 | P8 | P7 | P6 | P5 | P4 | P3 | P2 | P1 | P0 |
| 1 | 1 | 0 | P8 | P7 | P6 | P5 | P4 | P3 | P2 | P1 |
| 2 | 1 | 1 | 0 | P8 | P7 | P6 | P5 | P4 | P3 | P2 |
| 3 | 1 | 1 | 1 | 0 | P8 | P7 | P6 | P5 | P4 | P3 |
| 4 | 1 | 1 | 1 | 1 | 0 | P8 | P7 | P6 | P5 | P4 |
| 5 | 1 | 1 | 1 | 1 | 1 | 0 | P8 | P7 | P6 | P5 |
| 6 | 1 | 1 | 1 | 1 | 1 | 1 | 0 | P8 | P7 | P6 |
| 7 | 1 | 1 | 1 | 1 | 1 | 1 | 1 | 0 | P8 | P7 |
| 8 | 1 | 1 | 1 | 1 | 1 | 1 | 1 | 1 | 0 | P8 |
| 9 | 1 | 1 | 1 | 1 | 1 | 1 | 1 | 1 | 1 | 0 |
| 10 | 1 | 1 | 1 | 1 | 1 | 1 | 1 | 1 | 1 | 1 |

There are two duplicate map copies provided; one for the modulation to the left side of the texture edge crossing and one for the modulation to the right side of the texture edge crossing. Texture edge smoothing is provided by calculating the area subtended to the right of the texture edge for each of the four pixels. This calculation is accomplished first by shifting the upper corner pattern address value ($P_{I,J}$) and the two pattern gradients ($\Delta P_J, \Delta P_I$) by the 4-bit LOD number control in registers 116, 118 and 120, respectively. This information is sufficient to then determine the slope and position of the texture edge. The areas subtended by the individual pixels can then be determined based upon the geometry of the texture edge crossing. This calculation is handled by preprogrammed PROM firmware 138. The PROMs also determine the address for the right texture map by selecting either a ±1.0 addition in adders 122 and 124.

Smooth LOD blending is provided between the first and next LOD texture map by the following calculation performed in units 134 and 136:

$$T = \alpha \cdot Mn + (1-\alpha)M.$$

This calculation is performed separately for the left texture map in 134 and for the right texture map in 136. Texture edge smoothing is performed in units 140, 142, 144 and 146 for the four pixels using the following formula:

$$T_x = A_x \cdot T_L + (1 - A_x) T_R.$$

Figure 12:
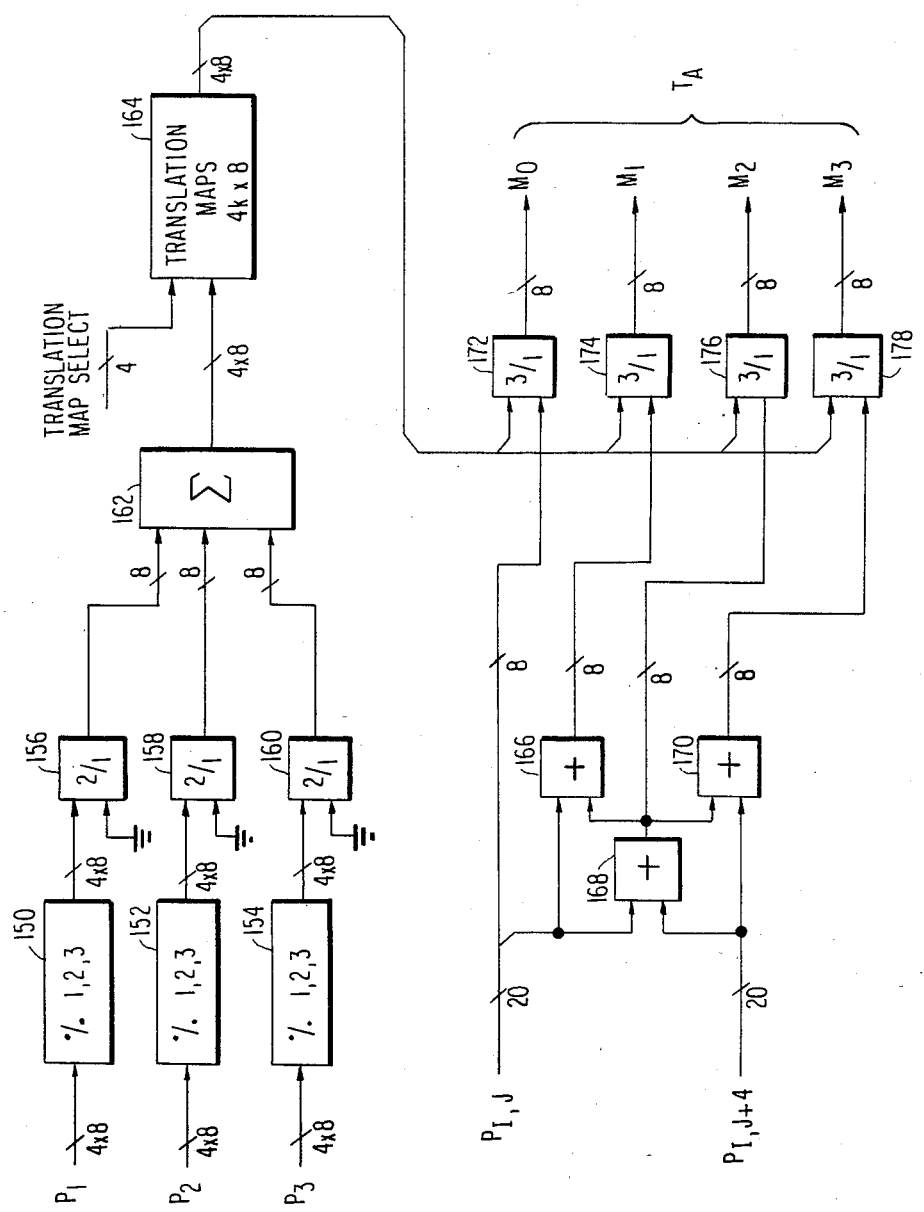
FIG. 12 is a block diagram of shading computer 40 of the texture/shading generator shown in FIG. 7.

The shading computer 40 which does the three pattern texture combination and shading is shown in FIG. 12. Three multiplexers 156, 158 and 160 are used to select the particular texture pattern combination Pn which will be used on the face being processed. The three texture modulations are first scaled by one, two or three in dividers 150, 152 and 154 before being summed in the adders of summer 162. This prescaling of the modulations is used to prevent overflow after pattern summation. The modulations are then routed through translation maps 164 which can add special effects to the summed patterns. These maps have the texture modulation from summer 162 connected to the address input to the maps. Thus, any desirable pattern transformation can be applied to the modulation. If a map has the current address stored at each memory location, then no transformation will take place. Any desired deviation can be applied starting from this basis. There are a total of sixteen different transformation maps selectable using the 4-bit translation map select inputs.

The shading modulation is obtained by the linear interpolation of the 20-bit fixed point pattern numbers $P_{I,J}$ and $P_{I,J4}$ obtained from adders 98 and 100. This interpolation is performed in adders 166, 168 and 170 by a simple sum and divide by a two shift operation between the $P_{I,J}$ left side pattern value and the $P_{I,J4}$ right side pattern value. Logic similar to adders 166, 168 and 170 constitutes the shading computer 41. The selection of shading, texture or no modulation for a display face is made by the multiplexers 172, 174, 176 and 178. The modulation outputs are used to vary an object's normal face color to some other value. This change is performed by multiplying the existing face color by the modulation outputs. Selection logic is included to modulate any combination of the red, green or blue component of the face color so that either monochrome or color modulation may be obtained.

From the foregoing description of the preferred embodiment of the invention, it will be appreciated that a minimum amount of hardware is required to implement the true-perspective texture/shading processor according to the invention. This is accomplished by specifying a single set of gradients, start values and map codes to define a continuous texture pattern covering any number of faces. This eliminates the need to project gradients independently for each face thereby reducing both storage and processing requirements.

We claim:

1. In a computer image generator of the type wherein computations are performed in sequence by a plurality of groups including a first group which manages a visual data base and transfers data to an active environment storage of a second group, said first group determining the position of a viewpoint and any moving models in a common coordinate system and generating trigonometric coefficients required for perspective transformation, said second group reducing a three-dimensional description of the environment supplied by said first group to a two-dimensional description, making perspective transformation of data into coordinates of a view window and assigning a priority to each surface of the computed scene, and a third group which reduces the two-dimensional description generated by said second group to a scan line by generating edge data to locate where edges cross the scan line and responds to the assigned priorities to eliminate hidden surfaces and generates the video for display including edge smoothing, shading and texture effects, the improvement comprising texture/shading processing means which defines modulations globally over an entire simulated, visual environment, said texture/shading processing means comprising:

face modulation processing means in said second group for computing data describing each one of a plurality of texture and shading models and data describing the plane of each one of a plurality of textured or shaded faces;

texture/shading generator means in said third group responsive to initialization data from said first group and the data computed by said face modulation processing means for computing texture and shading modualtion signals based on a model using parallel planes defined in three-dimensional space to divide any number of faces into texture and shading stripes wherein said texture/shading generator means comprises:

pattern memory means connected to said face modulation processing means for storing the data describing each texture and shading model;

face memory means connected to said face modulation processing means for storing the data describing the plane of each textured or shaded face;

edge memory means for storing edge data;

data register means connected to said first group for storing a line and element number of a pixel at a relative line number and element number;

edge crossing control means connected to said edge memory memory means and said data register means for computing a relative line number and element number;

first distance calculator means connected to said face memory means and said edge crossing control means and responsive to data addressed by said edge memory means for computing the distance to each pixel group;

first base number calculator means connected to said pattern memory means, said edge crossing control means and said first distance calculator means and responsive to data addressed by said face memory means for mapping each pixel group into texture stripe numbers;

texture computer means connected to said first base number calculator means for storing texture modulating maps and computing blending and smoothing of the maps selected by the base number calculation; and first shading computer means connected to said first base number calculator means and said texture computer means for computing by linear interpolation the shading modulation based on the base number calculation and selecting shading, texture or no modulation to the video for display.

2. The improved computer image generator as recited in claim 1 wherein said first base number calculator means and said texture computer means are replicated three times, one for each of three gradients defining a parallel series of planes of equal intensity, and wherein said edge memory means further stores hold flags indicating that data for a current face to be retained for shading computations in the next pixel group, said improved computer image generator further comprising:

second distance calculator means connected to said face memory means and said edge crossing control means and responsive to said hold flags and data addressed by said edge memory means for computing the distance to the next pixel group;

second base number calculator means connected to said pattern memory means, said edge crossing control means and said second distance calculator means and responsive to said hold flags and data addressed by said face memory means and read out of said pattern memory means for computing the shading modulation of the next pixel group; and second shading computer means connected to said second base number calculator means for computing by linear interpolation the shading modulation based on the output of said second base number calculator means for modulating the video display of the next pixel group.

3. The improved computer image generator as recited in claim 1 wherein said first distance calculator means includes means for generating a series expansion reciprocal common denominator and said first base number calculator means includes means for calculating multiple pattern base numbers by multiplying said series expansion reciprocal common denominator distance term with global numerator terms which define texture pattern orientations and spacing.

4. The improved computer image generator as recited in claim 2 wherein said first distance calculator means includes means for generating a first series expansion reciprocal common denominator, said first base number calculator means includes means for calculating multiple pattern base numbers by multiplying said first series expansion reciprocal common denominator distance term with global numerator terms which define texture pattern orientations and spacing, said second distance calculator means includes means for generating a second series expansion reciprocal denominator term, and said second base number calculator means includes means for multiplying said second series expansion reciprocal denominator by a single numerator.

5. The improved computer image generator as recited in claim 1 wherein said texture computer means includes means for storing multiple texture maps with precalculated levels of detail.

6. The improved computer image generator as recited in claim 5 wherein said texture computer means further includes means for smooth blending of the map levels of detail.

7. The improved computer image generator as recited in claim 6 wherein said texture computer means further includes means for calculating texture edge crossings and generating texture edge smoothing of crossing stripes by using only the left pattern corner value and two pattern gradients in the display view plane.

8. The improved computer image generator as recited in claim 7 wherein said first shading computer means includes means for summing multiplicative texture patterns into a texture combined modulation.

9. The improved computer image generator as recited in claim 8 wherein said first shading computer means further includes translation map means for translating said texture combined modulation by a selectable deviation from the summed multiplicative texture patterns.

10. The improved computer image generator as recited in claim 9 wherein said first shading computer means further comprises means for the multiplicative shading or texture modulation of a face red, blue or green color component in any combination so as to achieve a monochromatic or color modulation of said face.

* * * * *